(No Model.) 2 Sheets—Sheet 1.
J. M. FOSTER.
SYSTEM OF STEAM PIPING.
No. 532,655. Patented Jan. 15, 1895.
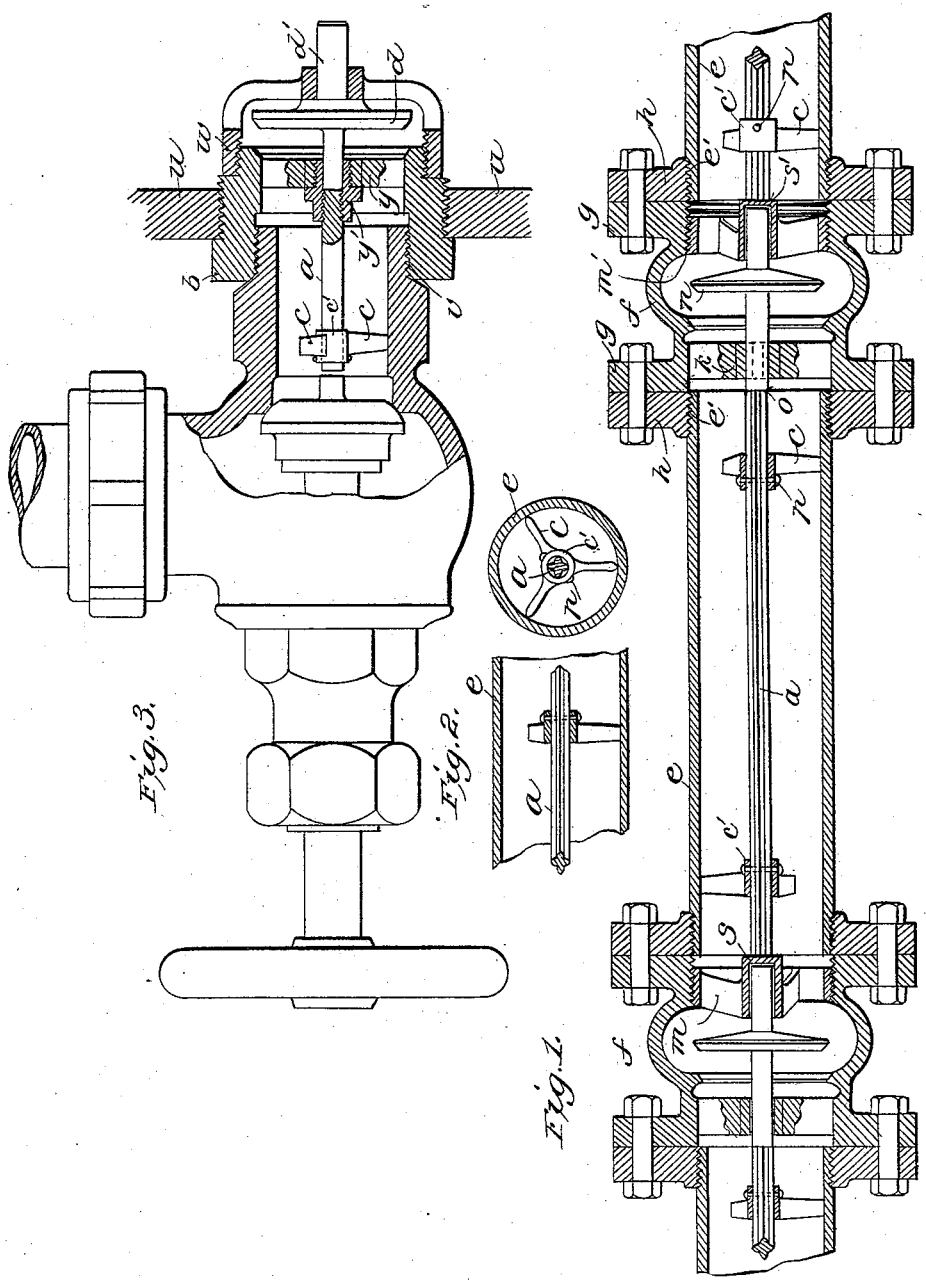
Witnesses
Harry T. Rohrer
M. Darley
Inventor:
John M. Foster,
By Wm. E. Dye.
Atty.

(No Model.) 2 Sheets—Sheet 2.
J. M. FOSTER.
SYSTEM OF STEAM PIPING.
No. 532,655. Patented Jan. 15, 1895.
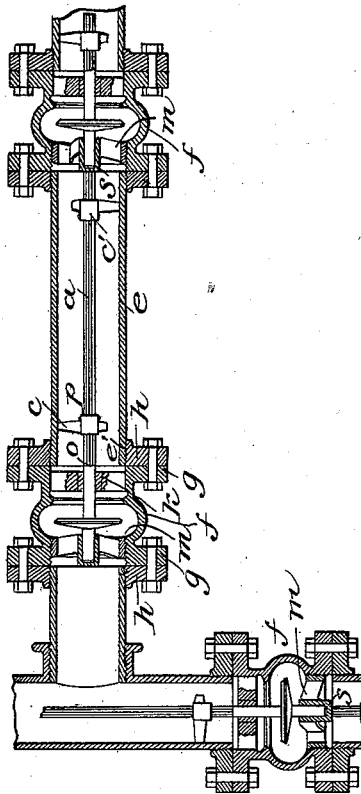
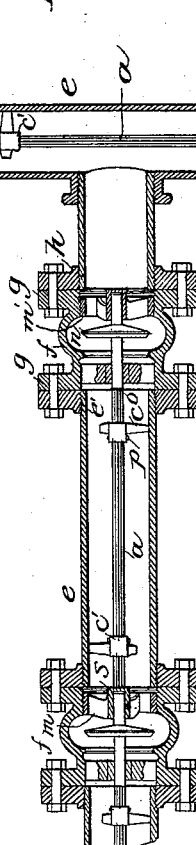
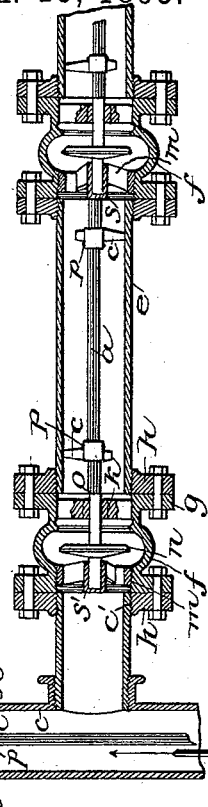
Fig. 4.
Witnesses.
F. W. Ritter Jr.
N. E. Auginbaugh
Inventor.
Jno. M. Foster
By Wm. E. Dyre.
Attorney

UNITED STATES PATENT OFFICE.

JOHN M. FOSTER, OF ELIZABETH, NEW JERSEY.

SYSTEM OF STEAM-PIPING.

SPECIFICATION forming part of Letters Patent No. 532,655, dated January 15, 1895.

Application filed September 30, 1893. Serial No. 486,873. (No model.)

*To all whom it may concern:*

Be it known that I, JOHN M. FOSTER, of the city of Elizabeth, county of Union, and State of New Jersey, have invented a new and useful Improved System of Steam-Piping, of which the following is a specification.

Generally stated this invention relates to a system for piping or conveying steam, gas, air or other liquids under pressure from a common source of power to a multiplicity of motors or engines located within the system; of means for automatically checking the flow of such liquids through said system of pipes or particular portions thereof when occasion arises; and similar means of preventing escape of the liquid from a generator through the supply valve, safety-valve, water-gages, or other couplings communicating directly with the generator. In this connection the invention is specially arranged, designed, and adapted for use on vessels of war employing in addition to the main propelling engines a large variety of auxiliary engines all deriving their motive force from the one common source of power, as for instance donkey engines for manipulating capstans, anchor-hoists, ash-hoists, boat-hoists, shot-hoists, &c., engines for sluing and operating gun-carriages, for creating forced drafts to the furnaces, for operating ventilating fans, dynamos, steering apparatus, &c.

The characteristic feature of my invention is a check-valve, of which there are a series located within the various supply pipes, adapted to be automatically closed in the event of bursting or other injury to said pipes, such for instance, as would be caused by the concussion of a shot or shell during an engagement, allowing one or more of the auxiliary engines to be cut off without necessarily disabling all, and at same time avoiding the disastrous effects incident to the escape of live steam under high pressure into portions of the vessel or among the men.

The auxiliary engines being located about the vessel, both above and below the armor deck, as convenience may indicate, communicate with the main boilers through the system of pipes aforesaid, while in the latter are placed the check valves at certain specific localities or at equal distances apart throughout the entire system, the valves being held normally open by an internal rod made of metal sufficiently brittle to break in the event its surrounding pipe is carried away or receives a blow with force enough to break or seriously bend it. As the result of such rupture or bend in one or more sections of my improved piping system the valve next nearest the supply valve or boiler will automatically close, thus shutting off all steam from the broken section and all sections with which it directly communicates, without destroying or reducing the efficiency of those sections back of the broken one or the laterals communicating therewith.

By preference the valve-supporting rod is made of fragile material adapted to be easily broken, but obviously this rod could be made of unbreakable material and the same effect produced by interposing between it and the valve which it supports a breakable connection, all as will later appear.

In the accompanying drawings hereto annexed, which form part of this specification, and in which like letters indicate like parts wherever employed, Figure 1, represents a longitudinal vertical section showing one of the blocks or sections with valve. Fig. 2, represents a transverse section on the line $x$—$x$ Fig. 1, and a fragmentary longitudinal vertical section at same point. Fig. 3, represents a somewhat modified form of my invention consisting of a globe supply-valve, applied directly to a boiler and embodying a check-valve, a safety rod for holding it normally from its seat, and a fragile connection between said check-valve and safety rod; and Fig. 4, represents a horizontal sectional view through several communicating blocks of which my system is composed.

Reference being had to the accompanying drawings and letters thereon $e$ indicates blocks or sections of steam piping, each being threaded at their ends and having circular collars $h\ h$ screwed upon them as at $e'$.

$f$ indicates valve cases provided with projecting circular flanges $g\ g$ at either side, which flanges like their adjacent collars $h$, are surfaced to insure a steam tight joint between said parts when bolted together. Within each valve case $f$ is located a valve $n$ having a stem projecting upon both sides of its center, and resting in suitable guides $k\ m$, also within said case, the former being cast integral therewith, and the latter being screwed within the case, as shown at $m'$. These guides are by preference of spider form to provide for free ingress and egress of steam, and in them the double stem of valve $n$ is adapted to reciprocate, being limited in its movement one way by the closed end $s$ of guide $m$ and in the opposite direction by a safety rod $a$ now to be described. A safety rod $a$ is located in each block or section $e$ of piping, in the longitudinal center of which it is supported upon guide wings $c\ c$ radiating like wheel spokes from a hub or sleeve $c'$ through which said rod passes, and in which it is secured by transverse pins $p$ passing therethrough.

Rods $a$ are of brittle material such as rapidly chilled gray iron, by preference cast or otherwise formed with an irregular cross section to render them more fragile, each rod being so arranged within its respective section that one extremity thereof is seated upon the closed end or stop $s$ of the guide $m$ while the opposite extremity abuts against the protruding end of a valve stem, thus holding the valve $n$ normally from its seat, as shown by Fig. 1, and allowing steam to pass freely through the pipes $e$ to its various points of utilization. In this construction it is obvious that steam or other fluids are permitted to flow freely from the generator throughout the entire system so long as the valves $n$ are held normally from their respective seats by operation of the safety-rods $a$. If, however, one or more of the blocks or sections $e$ are broken or seriously bent by the concussion of a cannon ball or from other causes, it is equally apparent that the fragile rod $a$ within such section will be fractured, and the support for the valve $n$ next nearest the generator being removed that particular valve will automatically close under pressure of steam from behind, thus cutting off all sections more remote from the supply without interfering with those nearer the generator.

While the above describes my invention in its preferred form it is quite obvious that safety-rod $a$ need not necessarily be made of unbreakable material, since the function and operation of the invention would be the same if rod $a$ was of wrought metal and coupled to or held against its co-acting valve-stem by a reduced or weakened thimble, adapted to be easily broken by a blow upon the pipe on section in which it is located.

A modification such as referred to is illustrated by Fig. 3 of the drawings, being specially efficacious in connection with valves located upon the surface of a boiler or generator, at points where they may possibly be carried away bodily. The drawings represent a globe valve suitable for supplying steam to my improved system of piping from a generator, and includes a foundation thimble $b$ tapped within a boiler head as $u$ into which the valve is screwed as at $v$. Within the boiler and coupled by a threaded connection to said foundation thimble $b$ is a cap or guide piece $w$ through the center of which the stem $d'$ of the valve $d$ slides. On the opposite side of valve $d$ the foundation thimble $b$ is provided with a guide $y$ for the valve stem, which guide is tapped to receive a small breakable thimble $y'$ serving as a fragile coupling between the valve stem and a projecting safety rod $a$ of unbreakable material. Rod $a$ in the latter construction is supported within the neck of the supply valve as shown by the same arrangement of wings $c$, sleeve or hub $c'$ and pin $p$ as heretofore described, and in the event of injury to said valve it is obvious that a blow communicated to the rod $a$ serves to fracture the coupling thimble $y'$ whereupon its support being removed, the check valve $n$ will immediately be blown outward and firmly seated by pressure from within, thus preventing the escape of steam.

Having thus described my invention, what I claim, and desire to secure by Letters Patent, is—

1. In a system of steam piping a section or block of pipe provided with a valve-case, a reciprocating valve located therein, fixed guides for the valve stem, a fragile rod projecting from the valve into the block, and a seat for one end of said rod within the block whereby the valve is held normally open, substantially as described.

2. In a system of steam piping a section or block of pipe provided with a valve case, a reciprocating valve located therein, fixed guides for the valve stem on either side of the valve, a fragile rod projecting from the valve into the block, and a seat for one end of said rod within the block whereby the valve is held normally open, substantially as described.

3. A system of steam piping consisting of connected sections or blocks each provided with a valve case and seat, a reciprocating valve located in each case, fixed guides for each valve stem, one having a closed end against which the stem abuts, a fragile rod projecting from each valve into its adjacent block, and a seat for such rods within the block whereby the valve is held normally open, substantially as described.

4. A system of steam piping consisting of connected sections or blocks each provided with a valve case and seat, a reciprocating valve located in each case, fixed guides for the valve stems having a closed end against which the stem abuts, a fragile rod projecting from the valve into the block, a seat for said rod within its block, and guide wings secured to the rod engaging the bore of the pipe section, substantially as described.

5. A system of steam piping consisting of connected communicating sections or blocks each provided with a valve case and seat, a reciprocating valve in each case, a fragile rod projecting from each valve into its block, fixed guides for the valve stem one having a closed end upon opposite sides of which the valve stem of one section and the fragile rod of the adjacent section abut, and guide wings upon such rods engaging the bore of their respective sections, substantially as described.

In testimony that I claim the foregoing improved system of steam piping as above described I have hereunto set my hand this 18th day of September, 1893.

JOHN M. FOSTER.

Witnesses:
  I. S. McGIEHAN,
  W. A. SPENCER.